Patented Apr. 26, 1927.

1,626,042

UNITED STATES PATENT OFFICE.

FRED M. LOCKE, OF VICTOR, NEW YORK.

GLASS.

No Drawing. Application filed August 28, 1916, Serial No. 117,227. Renewed October 29, 1926.

The present invention relates to glasses and to batches for producing the same, an object of this invention being to provide low expansion boro-silicate glasses which have high stability and are free from brittleness.

Prior to this invention, boro-silicate glasses of low expansion have been known, but in all such glasses it has been customary to use alkali carbonates as a flux. I have discovered that by the elimination of the alkali carbonates and the use of alkali nitrates, such as potassium nitrate or sodium nitrate, in connection with boro-silicate glasses, that I am able to obtain a glass of lower expansion with less brittleness, and, in connection with some batches, a pure white transparent glass may be obtained, where the same would be impossible with batches employing alkali carbonates.

The following is an example of a batch made in accordance with this invention:

80 parts silica or 10 parts boric acid, 10 parts alkali nitrates, as for instance; 5 parts potassium nitrate; and 5 parts sodium nitrate. 10 parts cryolite. And 1 part lepidolite. The lepidolite facilitates the working of the glass but is not essential for some of the features of this invention. The fluorine in the cryolite permits the silica to be fused at a lower temperature and in this way permits the use of a greater amount of silica.

Another glass made in accordance with this invention has an analysis substantially as follows:

$SiO_2$ 78.73%, $Li_2O$ 1.33%, $Al_2O_3$ and FeO .86%, $Na_2O$ 4.25%, $K_2O$ .62%, $B_2O_3$ 14.22%, giving in all, alkali oxides to the amount of 6.20%. The glass above mentioned has a coefficient of expansion of approximately .0000032.

Another glass made in accordance with this invention gives an analysis approximately $SiO_2$ 71%, $B_2O_3$ 28% and $Li_2O$ 1%. This glass has a coefficient of expansion of approximately .0000029.

Still another glass which can be made in accordance with this invention gives an analysis approximately, silica 75%, $B_2O_3$ 15%, $Li_2O$ 1%, $Al_2O_3$ 5%, $Na_2O$ 4%. This glass has a co-efficient of expansion of approximately .0000040.

Still another glass within this invention shows an analysis approximately as follows: $SiO_2$ 70%, $B_2O_3$ 13%, $Li_2O$ 9%, $Al_2O_3$ 2%, $Sb_2O_3$ 6%. This glass has a coefficient of expansion of approximately .0000056.

Glasses made in accordance with this invention are extremely useful in the manufacture of articles exposed to extreme variations of temperature and subject to attack by a chemical action. In addition to their use for cooking vessels and culinary ware, they are also highly efficient insulators and particularly insulators for carrying high voltage current. It is apparent however, that the glass may be used in the manufacture of any article which requires high stability and a low coefficient of expansion. The nitrates answer the purpose of a flux and at the same time give lower expansion and lessen the brittleness. In addition they tend to also increase the stability. I am aware that it is old prior to this invention to use nitrates for the purpose of purifying glass to make it whiter, but in the compositions heretofore used, the nitrates have not had also the function of lowering the expansion and reducing the brittleness. I do not wish to be limited to the specific batches herein specified, nor do I limit myself to the specific analysis of the finished glasses, as small impurities enter into the making of all glasses.

What I claim as my invention and desire to secure by Letters Patent is:

1. A boro-silicate glass batch containing an alkali metal nitrate and a relatively large percentage of silica.

2. A glass of high stability having a coefficient of expansion of less than .0000040 and formed by fusing a batch comprising a nitrate of an alkali metal and a relatively large percentage of silica to form a homogeneous body.

3. A boro-silicate glass batch containing an alkali metal nitrate, a relatively large percentage of silica, and a small percentage of alumina.

4. A boro-silicate glass of high stability containing approximately 79% of silica, approximately 14% boric oxide, a small amount of alumina, and approximately 5% of alkali.

5. A boro-silicate glass of high stability containing between 70 and 79 per cent of silica, not above 28 per cent of boric oxide, not above 5 per cent of alumina, not above 9 per cent of alkali and formed by fusing a batch containing a nitrate of an alkali.

6. A glass having substantially the following analysis: $SiO_2$ 78.73%, $Li_2O$ 1.33%, $Al_2O_3$ and FeO .86%, $Na_2O$ 4.25%, $K_2O$ .62%, $B_2O_3$ 14.22%.

7. A glass having substantially the following analysis: $SiO_2$ 78.73%, alkalies 6.20%, $Al_2O_3$ and FeO .86%, $B_2O_3$ 14.22%.

In witness whereof I have hereunto set my hand this 19th day of August, 1916.

FRED M. LOCKE.